United States Patent [19]

Lemonde

[11] 4,130,344
[45] Dec. 19, 1978

[54] CONNECTOR FOR OPTICAL FIBRES

[75] Inventor: Jean-Louis Lemonde, Le Chesnay, France

[73] Assignee: Compagnie Industrielle des Telecommunications Cit-Alcatel, Paris, France

[21] Appl. No.: 826,099

[22] Filed: Aug. 19, 1977

[30] Foreign Application Priority Data

Aug. 24, 1976 [FR] France ............... 76 25578

[51] Int. Cl.$^2$ ................. G02B 5/14
[52] U.S. Cl. ................. 350/96.21; 33/286; 350/96.20
[58] Field of Search ............ 350/96.20, 96.21

[56] References Cited

U.S. PATENT DOCUMENTS

| 3,947,088 | 3/1976 | French ............... 350/96.20 |
| 4,087,155 | 5/1978 | Deacon ............... 350/96.21 |

FOREIGN PATENT DOCUMENTS 2602662  7/1977  Fed. Rep. of Germany ........ 350/96.21

OTHER PUBLICATIONS

Strong, *Procedures in Experimental Physics*, Prentice-Hall Inc., (New York), Jun. 1947, Chap. XIV: pp. 585–586.

Primary Examiner—John K. Corbin
Assistant Examiner—John D. Lee
Attorney, Agent, or Firm—Sughrue, Rothwell, Mion, Zinn and Macpeak

[57] ABSTRACT

The ends of two optical fibres to be joined are housed in sleeves which include assembly means for uniting the sleeves front face to front face. A point-line-plane positioning arrangement ensures that each time the connector is re-closed its sleeves take up the same axial disposition with respect to each other. Structure is provided to adjust the axial position of the fibres so that they look into each other at the said same axial disposition. Once set up the connection can be repeatedly opened and closed with reproducible transmission characteristics.

17 Claims, 6 Drawing Figures

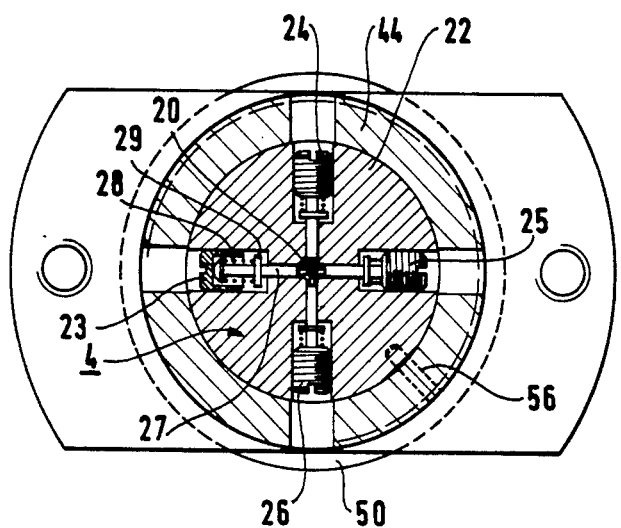

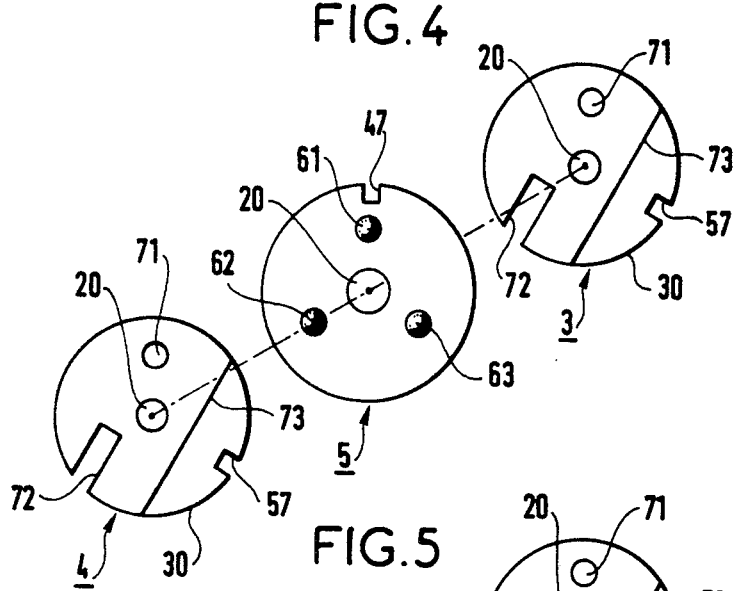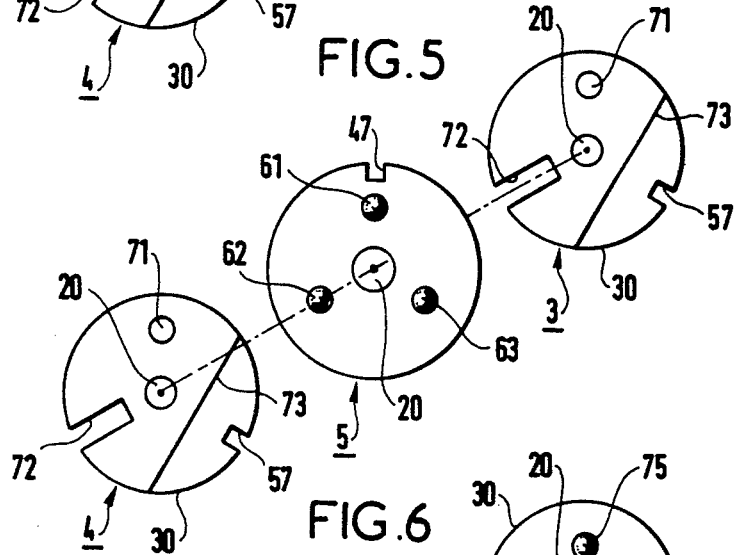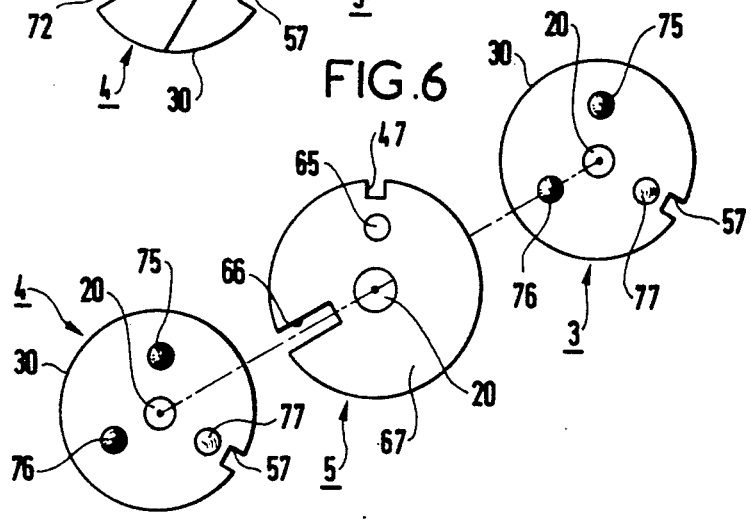

CONNECTOR FOR OPTICAL FIBRES

FIELD OF THE INVENTION

The invention comes within the field of data transmission by optical fibres. It relates more particularly to an optical fibre connector ensuring the interconnection of sections of optical fibres to constitute a continuous long-distance connection.

BACKGROUND OF THE INVENTION

The quality of a transmission system using optical fibres as a transmission medium is especially related to the quantity of couplings between sections of optical fibres forming each transmission line. Coupling between two ends of fibre must indeed meet numerous requirements, in particular for axial alinement and small spacing of the front surfaces at the connection. Further, the industrial use of optical fibres as a transmission medium requires that the connections between sections be easy and fast to make while meeeting the above-mentioned requirements relating to the quality of the connection.

Preferred embodiments of the present invention provide a connector for optical fibres meeting these requirements and also making it possible to maintain the quality of the connection after each uncoupling and re-coupling of the sections of fibre.

SUMMARY OF THE INVENTION

The present invention provides a connector for optical fibres, the connector comprising two interconnectable cylindrical sleeves each with an axial channel for receiving the end of an optical fibre to be connected, and assembly means for assembling the sleeves with their respective channels in alinement, the assembly means including a point-line-plane positioning arrangement disposed between the facing front surfaces of said sleeves to define a reproducible positioning of one sleeve in relation to the other, the sleeves including transverse positioning means acting on the ends of the fibres in their respective channels, for alinement of the ends of the fibres, said transverse positioning means comprising a set of radially oriented rods of adjustable radial position.

Preferably the point-line-plane positioning arrangement comprises a set of three non-alined reference markers on one of the facing surfaces facing a cooperating set of three non-alined reference markers on another one of the facing surfaces, the reference markers co-operating in pairs as follows: a first pair of markers provide three points of contact between the facing surfaces thereby defining a fixed point of co-operation being located at the centre of a circle passing through the three points of contact; a second pair of markers provide two points of contact between the facing surfaces thereby providing a contact free to move along a line of co-operation between the surfaces, said line extending perpendicularly to the line joining the two points of contact; and a third pair of markers provide one point of contact between the facing surfaces thereby providing a contact free to move in a plane.

The connector may advantageously include a centering washer disposed between the sleeves and having opposite surfaces which face the front surfaces of the sleeves, the assembly means including two point-line-plane positioning arrangements disposed between the respective pairs of facing surfaces. In that case, the point-line-plane positioning arrangements are arranged to be identical on the front surfaces of the sleeves with the facing surfaces of the washer arranged to co-operate with the identical arrangements on either side.

The arrangement according to the invention makes it possible to adjust the transverse position of the fibres inside the channels once the connector is installed, so that they transmit the maximum quantity of light and then to observe the same transmission characteristic after each uncoupling and assembling, since the two ends of the fibres are then set automatically in the same relative position.

Other characteristics and advantages of the present invention will become apparent from the description of various embodiments given by way of example with reference to the accompanying drawings.

BRIEF DESCRIPTION OF THE DRAWINGS

FIG. 2 is a side view along a section II—II in FIG. 1;

FIG. 3 shows the front faces of elements in FIG. 1; and

FIGS. 4 to 6 are similar to FIG. 3 and show variants with other dispositions on the front surfaces of elements forming a connector of the type shown in FIG. 1.

DESCRIPTION OF THE PREFERRED EMBODIMENTS

Figure 1:
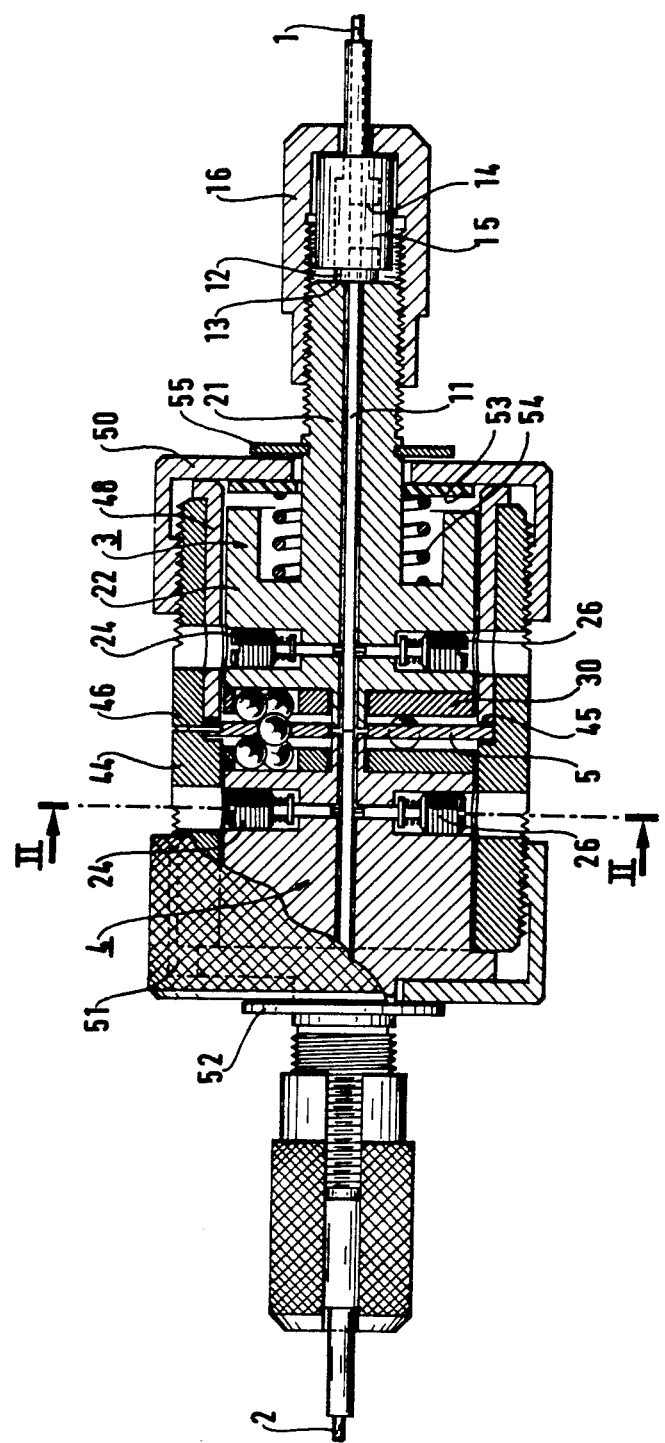
FIG. 1 is a front view of a partial cross-section of a connector embodying the invention.

In FIG. 1, the connector ensures the connection between the ends of two optical fibers 1 and 2 whose front surfaces, previously prepared, are positioned and maintained facing one another at a very short distance apart. The connector comprises three parts: two sleeves 3 and 4 and an intermediary centering washer 5 each having an internal axial channel, not referenced here. These channels enable the two ends of the fibres which are to be connected to pass through and are aligned when the sleeves and the washer are assembled. The ends of the fibres to be connected are previously equipped with an end piece in which each end can be centred or moved off-centre.

The fibres 1 and 2 whose cores are made e.g. of doped silica, with a cladding of pure silica are covered with an outer covering protecting them and imparting mechanical strength to them. At each end to be connected, the outer covering is removed, while the bared end is fitted with an end piece providing protection thereto and constituting a pre-centering element for the fibre in the connector.

With reference to FIG. 1, it is seen that the end piece of each fibre e.g. fibre 1 comprises a calibrated tube 11 installed on the bared end of the fibre and mounted on a tube-carrying sleeve 12. This tube-carrying sleeve 12 is fast with the protective covering of the fibre. It covers a bared portion of the fibre between the ends of the calibrated tube and the protective covering of the fibre. The front end of the tube-carrying sleeve 12 forms a shoulder 13 on the tube, the distance between the shoulder and the front surface of the end of the fibre being perfectly defined as a function of the dimensions of the connector. A binding agent inside the tube and the tube-carrying sleeve ensures that the fibre is maintained in the tube. This binding agent is neither shown nor referenced in the figures.

The tube-carrying sleeve has a lateral hole or window 14 perpendicular to the bared portion of the fibre surrounded by this sleeve. The lateral hole makes the insertion of the binding agent inside the sleeve and of the tube possible.

This binding agent ensures the holding of the end of the fibre in the tube after positioning at the defined distance of the shoulder 13 in relation to the front surface of the fibre and centering of the end of the fibre in the tube.

Further, the end piece of the fibre comprises a cylindrical cap through whose base the tube-carrying sleeve passes at the covered fibre part. This cap covers at least the part of the tube-carrying sleeve 12 which comprises the lateral hole 14. It is used essentially for the insertion of the binding agent in the tube-carrying sleeve and the tube: since the end piece is held vertical, this binding agent, chosen advantageously from among polymerisable cements, is injected into the cap, spreads in the sleeve and rises by capillarity into the tube, between the tube and the bared fibre. The end piece of the fibre is also completed by a knurled knob 16 which covers the rear part of the end piece, leaving the tube 11, with which it is not in contact, on the outside. The covered fibre on which the base of the knob 16 is freely installed passes through this knob; it abuts against the base of the cap 15.

The end of each of the fibres 1 and 2 fitted with its end piece is inserted in the axial channel of one of the sleeves 3 and 4 of the connector; the front surfaces of the fibres are positioned substantially in the transverse mid-plane of the centering washer 5; this transversal mid-plane then constitutes the junction plane of the two fibres.

The elements which constitute the connector are described with reference to FIGS. 1 to 3. The two sleeves 3 and 4 are practically identical. Each sleeve is constituted by a cylindrical part with an axial channel 20 (FIG. 3) and has a threaded part 21 with a smaller diameter, called the rear part of the sleeve and a front part 22. The knurled knob 16, mounted on the covered fibre and surrounding the cap 15 of the end piece of the fibre is screwed onto the threaded rear part of the sleeve. The assembling of the knob 16 and of the rear threaded part 21 ensures the proper longitudinal positioning of the fibre in the connector; the shoulder 13 of the end piece abuts against the front surface of the rear threaded part 21 and the front end face of the fibre is then in the junction plane.

Four adjusting screws 23, 24, 25 and 26 disposed radially and in a cross-formation pass through the front part of the sleeve. The ends of these adjusting screws form rods which come out into the channel 20 with an adjustable recess to set the transversal position of each fibre inserted in its channel and to obtain alignment thereof. Each of the adjusting screws e.g. screw 23 comprises a hollow threaded knob bearing the same reference as the screw, mobile in its tapped recess, formed in the front part of the sleeve. It also comprises a push-rod 27 whose head bears against the bottom of the threaded knob and whose end leads into the channel 20. A spring 28 surrounds a part of the rod 27; this spring abuts between the head of the rod and an intermediary shoulder 29 on the rod; the spring is thus enclosed between the head of the rod and the shoulder and between the threaded knob and its recess. The arrangement of these adjustment screws allows a linear movement of the push-rod when the threaded knob rotates in its recess.

The front face of the front part 22 of each sleeve is defined by a disc 30 installed at the end of this front part. This front face bears three reference markers 31, 32 and 33 (FIG. 3) which are not aligned. The first marker 31 is formed by the space between three balls such as the ball 34, tangential to each other in pairs and recessed in a circular hole 35 formed in the surface of the disc 30.

The projections of the three markers on each front surface of the two sleeves on a plane parallel to those surfaces are strictly identical.

These three markers on each of the front surfaces of the two sleeves co-operate with three other markers 41, 42 and 43, on each of the surfaces of the intermediary washer 5. These two groups of three markers on the two surfaces of the washer 5 are constituted by the same three balls recessed in the washer; these three balls project identically on either side from both surfaces of the washer.

This washer 5 forming a ball cage is carried by a hollow cylindrical part 44, threaded at its two ends. The cylindrical part 44 carrying the washer has a circular groove 45 on its inside in the middle part. The periphery of the washer 5 is enclosed in this groove 45, leaving a small axial play for the washer. The rotation of the washer in the groove is limited by a stud 46 (FIG. 1) installed on the washer-carrying part and engaged in a cut-out 47 (FIG. 3) formed in the periphery of the washer.

This washer-carrying part 44 with the internal groove 45 is formed as shown in FIG. 1 by machining the part 44 so as to form a part with an inside diameter corresponding to the bottom of the groove. The washer is thus inserted in the machined part 44 and abuts against the side edge of the portion having the smallest inside diameter, constituting one of the edges of the groove. A ring 48 installed inside the machined part 44 is fixed on the part 44 and then traps the washer and thus completes the groove. This ring 48 has a flange at its end outside the part 44, this flange covering the edge of the part 44.

Further, the connector is completed by two tapped cowls 50 and 51. Each cowl is installed free on the rear part of a sleeve. The tapped cowls co-operate with the threaded ends of the washer-carrying part 44 to assemble the elements of the connector. The cowl 51 screwed onto the part 44 abuts against the side edge facing the front part of the sleeve 4. This cowl 51 is blocked in position by a circlip 52 inserted on the rear part of the sleeve 4 at the bottom of a groove, not shown.

The cowl 50, screwed onto the threaded end of the part 44 abuts against the edge of the ring 48 forming the flange. It then forms a stop for a washer 53 installed on the front part of the sleeve 3, machined to delimit a recess for a compressed spring 54. The spring 54 is closed in its recess by the washer 53 and the cowl 50. This spring 54 is designed to ensure good contact between the front surfaces adjacent to the sleeves and the intermediary centering washer. A circlip 55, analogous to the circlip 52, blocks the cowling from moving on the rear part of the sleeve 3 and prevents the inadvertent unscrewing thereof.

To guide the elements constituting the connector, a reference projection 56 (FIG. 2) inside the washer-carrying part at each end co-operates with a longitudinal groove such as 57 formed in the front part of each sleeve. These reference elements 56 and 57 are positioned in connection with the stud 46 limiting the rotation of the centring washer, to constitute a rough positioning of each sleeve in relation to the washer 5 when assembling the assembly.

The connection between two fibres is effected as explained hereinbelow. Each end of fibre equipped with its end piece is inserted in the channel of the sleeve. To position each fibre axially, the knob 16 is screwed on the rear part of the sleeve and thus holds the shoulder 13 of the calibrated tube of the end piece abutting against the rear front surface of the sleeve. Each sleeve then holds inside the end of a fibre which is positioned axially.

Each sleeve in which the end of a fibre is held is then inserted in the washer-carrying part 44 for assembling the two sleeves and hence the coupling between the ends of the fibres. The guiding of the sleeves into position is ensured by the reference elements 56–57 when they are inserted in the washer-carrying part 44. These reference elements allow the pairs of reference markers to be placed opposite one another on the adjacent faces of each sleeve and of the centering washer. The portions of balls projecting from each face of the washer are placed respectively in the space between the three balls, in the space between the two rolls and on the flat part of the surface of each sleeve.

For the first pair of reference markers, namely ball 41 for the washer 5, space 31 for either one of sleeves 3 and 4, the ball 41 comes into contact with three points respectively on the three balls such as 34 defining the space 31. This first pair of reference markers, taken alone, defines a first fixed connection point between the adjacent surfaces of the washer and of one of the sleeves, this fixed connection point being constituted by the centre of the contact circle of the ball 31 with the three balls such as 34.

This pair formed by the ball 41 and the space 34 allows any rotation about the centre of the contact circle.

For the second pair of reference markers, namely ball 42 for the washer and space 32 for either one of the sleeves, the ball 42 comes into contact at two points respectively on the two rollers such as 36 defining the space 32. This space is equivalent to a slot defined, delimited laterally by two parallel generatrices, respectively rollers. This second pair of reference markers, considered with the first pair of reference markers, defines a second connection point between the adjacent surfaces of the washer and of one of the sleeves; this second connection point being situated between two possible contact points along the slot, i.e. on the centre line of the segment of a straight line joining these two contact points. This second pair of reference markers formed by the balls 42 and the space 32 prevents rotation of the parts in the plane defined by the fixed connection point or centre of the contact circle and the two contact points obtained, by this second pair of reference markers.

For the third pair of reference markers, namely the ball 43 for the washer and the flat surface 33 for either of the sleeves, the ball 43 simply presses against the flat surface 33 and forms a one-point contact. This third pair of reference markers with the two preceding pairs of reference markers, defines the connection plane between the adjacent surfaces of the washer and of one of the sleeves and prevents any possible rotation about the centre of the contact circle between the reference markers of the first pair. This connection plane is then that containing the first fixed point or centre of the contact circle, the second connection point and the contact point given by the reference markers of the third pair.

These three pairs of reference markers therefore define a connection of the point-line-plane type between the two adjacent front surfaces of parts to be assembled. This same relative positioning between each sleeve and the washer, therefore between the sleeves; will be obtained at each new assembly of these parts. This connector therefore provides a perfectly reproducible connection between the parts which constitute it.

In this assembled connector, the fibres to be connected, integral with each sleeve have a defined axial position. The set of adjustment screws 24 to 26 then allows their transverse position to be set so as to obtain maximum light transmission. Due to the reproducibility of the relative positioning of the parts of the connector, the transverse positioning of the fibres in their respective channels is adjusted only once; the connector can be dismantled and assembled a great number of times while maintaining the transmission characteristics between the fibres thus connected.

FIGS. 4 to 6 show schematically a few variants concerning the pairs of reference markers providing connection between the parts of a connector embodying the invention. These variants are given with reference to FIG. 3, with a view to simplifying the description of these variants; the parts bearing these reference markers are designated by the references used in FIG. 3; the cut-away part 47 at the periphery of the washer is also seen as well as the longitudinal groove 57 on each sleeve co-operating respectively with studs for blocking the rotation of the washer and for guiding the sleeves when the connector is assembled.

In these FIGS. 4 to 6, as in FIG. 3, the front and back surfaces of the washer and of the reference markers which they bear are strictly identical.

In FIGS. 4 and 5, the reference markers on the two surfaces of the washer 5 are constituted by three balls 61 to 63, recessed in the washer substantially along the vertices of an equilateral triangle. The reference markers on each of the front surfaces of the sleeves 3 and 4 are formed by a hole 71, a slot 72 and a flat surface 73; these hollow reference markers are machined in the front disc 30 of each sleeve. In FIG. 4, the axes of the slot and of the hole are aligned and disposed along a cord; in FIG. 5 the axes of the slot and the hole are disposed radially.

In these FIGS. 4 and 5, the flat surface 73 is slightly recessed in relation to the surface of the front face of each sleeve. This disposition is equivalent to that of FIG. 3; it takes into account the fact that the space 31 and the space 32 (FIG. 3) are truly equivalent respectively to the hole 71 and to the slot 72 (FIGS. 4 and 5), but these spaces are delimited slightly above the surface of the front face of each sleeve.

In FIG. 6, the reference markers on the two surfaces of the washer are constituted by a hole 65, a slot 66 and the plate 67 of the face in question. The hole and the slot 65 and 66 are machined with precision; they pass through the washer. The projections of these reference markers on the front surface and on the back surface of the washer, on a plane parallel to the washer are identical. The reference markers on each of the front surfaces of the sleeves 3 and 4 are constituted by three balls 75, 76 and 77. The balls 75 and 76 co-operate with the hole and the slot 65 and 66 respectively, constituting two pairs of reference markers. The ball 77, which is more sunk in than the balls 75 and 76, in the end disc 30 of the sleeve, co-operate with the flat surface 67; they form together the third pair of reference markers.

In a variant, the washer can recess the three balls which delimit, on each of these surfaces, the space 31 (FIG. 3) and the two rollers delimiting the space 32; the front surfaces of the sleeves will then each bear three balls such as 41, 42 and 43 (FIG. 3).

For these three arrangements or means schematically shown in FIGS. 4 to 6 and for the arrangement or means explained as a variant, the point-line-plane connection principle between the adjacent surfaces is maintained.

Of course, other variants are possible. In particular, the front and back surfaces of the washer can bear on one of the surfaces of the hollow reference markers (hole or space between three balls and slot or space between two rolls) and on the other surface of the reference markers in relief (balls).

In any case, the set of reference markers which are identically disposed on the surfaces of the sleeves and of the washer project identically onto a plane parallel to the surfaces which bear them.

In another variant, not shown, the centering washer 5 is not included, whereas the front surfaces directly adjacent to the sleeves will bear respectively the three pairs of reference markers co-operating together.

The means mentioned can also be replaced by other equivalent means without thereby going beyond the scope of the invention.

What I claim is:

1. A connector for end to end connecting of optical fibres, said connector comprising; two interconnectable cylindrical sleeves, each sleeve having an axial channel for receiving the end of an optical fibre to be connected, and assembly means for assembling the sleeves with their respective channels in alignment, the assembly means including at least one point-line-plane positioning means disposed between the facing front surfaces of said sleeves to define a reproducible positioning of one sleeve in relation to the other, the sleeves including transverse positioning means acting on the ends of the fibres in their respective channels, for alignment of the ends of the fibres, and said transverse positioning means comprising a set of radially oriented rods of adjustable radial position.

2. A connector according to claim 1, wherein the point-line-plane positioning means comprises a set of three non-aligned reference markers on one of the facing surfaces, a co-operating set of three non-aligned reference markers on another one of the facing surfaces which faces said one surface, and wherein the reference markers co-operate in pairs as follows: a first pair of markers provide three points of contact between the facing surfaces thereby defining a fixed point of co-operation being located at the centre of a circle passing through the three points of contact; a second pair of markers provide two points of contact between the facing surfaces thereby providing a contact free to move along a line of co-operation between the surfaces, said line extending perpendicularly to the line joining the two points of contact; and a third pair of markers provide one point of contact between the facing surfaces, thereby providing a contact free to move in a plane.

3. A connector according to claim 2, wherein the reference markers of the first pair are constituted by three tangential balls disposed on one of the facing surfaces, and by a co-operating ball disposed on the other facing surface.

4. A connector according to claim 2, wherein the reference markers of the first pair are constituted by a hole with a circular cross-section formed in one facing surface and by a co-operating ball disposed on the other facing surface.

5. A connector according to claim 2, wherein the reference markers of the second pair are constituted by two tangential rollers disposed on one of the facing surfaces and by a second co-operating ball disposed on the other facing surface.

6. A connector according to claim 2, wherein the reference markers of the second pair are constituted by a slot formed in one of the facing surfaces and by a co-operating ball disposed on the other facing surface.

7. A connector according to claim 2, wherein the reference markers of the third pair are constituted by a flat part of one of the facing surfaces and a co-operating ball disposed on the other facing surface.

8. A connector according to claim 2 further including a centering washer disposed between the sleeves and having opposite surfaces which face the front surfaces of the sleeves, and the assembly means including two point-line-plane positioning means disposed between the respective pairs of facing surfaces.

9. A connector according to claim 8, wherein the point-line-plane positioning means are arranged to be identical on the front surfaces of the sleeves with the facing surfaces of the washer arranged to co-operate with identical positioning means on either side.

10. A connector according to claim 9, wherein the point-line-plane positioning means include one of each pair of surfaces disposing three balls for co-operating with point, line and plane reference markers on the other surface of each pair.

11. A connector according to claim 10, wherein the three said balls are held captive in the washer and project through both faces thereof.

12. A connector according to claim 10, wherein each of the sleeves houses its arrangement of three balls and the washer has two sets of point, line and plane reference markers to co-operate with the balls.

13. A connector according to claim 8, wherein the centering washer is carried by a hollow cylindrical washer-carrying part, provided interiorly with a circular groove in which the periphery of the centering washer is held.

14. A connector according to claim 13, including a stud carried by the said washer-carrying part and leading into the circular groove, said stud co-operating with a cut-away part on the periphery of the washer to limit the rotation of the latter.

15. A connector according to claim 13, wherein said assembly means also include threaded ends of said washer-carrying part and two hollow tapped cowls, installed respectively on the sleeves which they partly cover and being screwed respectively on the threaded ends of the washer-carrying part and trapping between them, said sleeves.

16. A connector according to claim 15, wherein at least one of the sleeves is machined and has an open cylindrical recess facing the associated cowl and in which is installed an elastic means enclosed in its recess when the sleeves are assembled.

17. A connector according to claim 1, comprising a precentering means for each fibre end, constituting a fibre end piece, said end piece comprising a calibrated tube; provided with a shoulder at a defined distance from the front surface of the fibre and in which the end face of the fibre is substantially coplanar with its end surface and is held centred, and said end piece additionally carrying, a means for fixing the end of the fibre in its sleeve providing axial positioning of the fibre.

* * * * *